US012768398B2

(12) United States Patent
Ito

(10) Patent No.: US 12,768,398 B2
(45) Date of Patent: Oct. 20, 2026

(54) BEARING DEVICE

(71) Applicant: NTN Corporation, Osaka (JP)

(72) Inventor: Hiroyoshi Ito, Kuwana (JP)

(73) Assignee: NTN Corporation, Osaka (JP)

( * ) Notice: Subject to any disclaimer, the term of this patent is extended or adjusted under 35 U.S.C. 154(b) by 181 days.

(21) Appl. No.: 18/854,675

(22) PCT Filed: Mar. 15, 2023

(86) PCT No.: PCT/JP2023/010150
§ 371 (c)(1),
(2) Date: Oct. 7, 2024

(87) PCT Pub. No.: WO2023/199689
PCT Pub. Date: Oct. 19, 2023

(65) Prior Publication Data

US 2026/0251176 A1 Aug. 27, 2026

(30) Foreign Application Priority Data

Apr. 11, 2022 (JP) ................................ 2022-065183

(51) Int. Cl.
*F16C 19/06* (2006.01)
*F16C 25/08* (2006.01)
(Continued)

(52) U.S. Cl.
CPC ............ *F16C 25/083* (2013.01); *F16C 19/06* (2013.01); *F16C 33/6607* (2013.01);
(Continued)

(58) Field of Classification Search
CPC .......... F16C 19/06; F16C 19/52; F16C 25/08; F16C 25/083; F16C 33/6603;
(Continued)

(56) References Cited

U.S. PATENT DOCUMENTS 6,338,576 B1 * 1/2002 Girardin ............... F16C 41/007 324/207.25
2012/0027329 A1 * 2/2012 Landrieve ............ H02K 11/215 384/448

FOREIGN PATENT DOCUMENTS

EP 3865724 A1 8/2021
FR 2851624 A1 * 8/2004 ............ F16C 41/007
(Continued)

OTHER PUBLICATIONS

International Search Report dated May 16, 2023, from International Application No. PCT/JP2023/010150, 4 pages. (with English translation).

(Continued)

*Primary Examiner* — Phillip A Johnson
(74) *Attorney, Agent, or Firm* — Rimon P.C.

(57) ABSTRACT

A bearing device includes: a rolling bearing having a rotation ring, a fixed ring, and a rolling element; a preload applying member; and a sensor unit. The rotation ring has a rotation ring raceway surface extending in a circumferential direction. The fixed ring has a fixed ring raceway surface extending in the circumferential direction and facing the rotation ring raceway surface with a space therebetween in a radial direction. The rolling element is disposed between the rotation ring raceway surface and the fixed ring raceway surface. The preload applying member applies a preload to the rolling bearing in an axial direction. The sensor unit is detachably attached to one of the fixed ring and the preload applying member, and includes a sensor that detects a state of rotation of the rotation ring.

7 Claims, 14 Drawing Sheets

(51) Int. Cl.
*F16C 33/66* (2006.01)
*F16C 33/78* (2006.01)
*F16C 41/00* (2006.01)

(52) U.S. Cl.
CPC ............ *F16C 33/78* (2013.01); *F16C 41/007* (2013.01); *F16C 2202/40* (2013.01); *F16C 2229/00* (2013.01)

(58) Field of Classification Search
CPC .......................... F16C 33/6607; F16C 41/007; F16C 2202/40; F16C 2229/00
See application file for complete search history.

(56) References Cited

FOREIGN PATENT DOCUMENTS

| | | | |
|---|---|---|---|
| JP | S60-31522 | U | 3/1985 |
| JP | 2005-256892 | A | 9/2005 |
| JP | 2009-36233 | A | 2/2009 |
| JP | 2016-130577 | A | 7/2016 |
| JP | 2018-44572 | A | 3/2018 |
| JP | 2020-85010 | A | 6/2020 |
| WO | 2009/004199 | A3 | 1/2009 |

OTHER PUBLICATIONS

Office Action dated Jun. 9, 2026, issued in corresponding Japanese patent application No. 2022-065183.

* cited by examiner

BEARING DEVICE

CROSS-REFERENCE TO RELATED APPLICATIONS

This application is the U.S. National Phase under 35 U.S.C. § 371 of International Application No PCT/JP2023/010150, filed on Mar. 15, 2023, which claims the benefit of foreign priority to Japanese Patent Application No. 2022-065183 filed on Apr. 11, 2022, the entire contents of each of which are hereby incorporated by reference.

TECHNICAL FIELD

The present invention relates to a bearing device.

BACKGROUND ART

Japanese Patent Laying-Open No. 2005-256892 (PTL 1) discloses a bearing equipped with a rotation sensor, wherein the bearing equipped with a rotation sensor includes a rolling bearing, a magnetic encoder, and a sensor unit.

The rolling bearing includes an outer ring, an inner ring, and a plurality of rolling elements. The outer ring has an outer ring inner diameter surface. The outer ring inner diameter surface extends in a circumferential direction. The inner ring has an inner ring outer diameter surface. The inner ring outer diameter surface extends in the circumferential direction and faces the outer ring inner diameter surface with a space therebetween in a radial direction. The plurality of rolling elements are disposed between the outer ring inner diameter surface and the inner ring outer diameter surface, and are arranged side by side in the circumferential direction.

The magnetic encoder includes a cored bar and a magnetic rubber layer. The cored bar is an annular member extending in the circumferential direction. The cored bar has a first portion and a second portion in the axial direction. The magnetic rubber layer is disposed on an outer diameter surface of the cored bar in the first portion. The inner ring is press-fitted into an inner diameter surface of the cored bar in the second portion. Thereby, the magnetic encoder is attached to the inner ring.

The sensor unit includes an external annular ring and a sensor housing including a sensor element. The external annular ring is an annular member extending in the circumferential direction. The external annular ring has a third portion and a fourth portion in the axial direction. The sensor housing is attached to an inner diameter surface of the external annular ring in the third portion. The fourth portion is press-fitted into the outer ring inner diameter surface. Thereby, the sensor unit is attached to the outer ring. The sensor element detects the state of rotation of the inner ring based on the change in the magnetic field from the magnetic encoder, the change resulting from the rotation of the inner ring.

CITATION LIST

Patent Literature

PTL 1: Japanese Patent Laying-Open No. 2005-256892

SUMMARY OF INVENTION

Technical Problem

In the bearing equipped with a rotation sensor disclosed in PTL 1, the fourth portion is press-fitted into the outer ring inner diameter surface, and thereby, the sensor unit is attached to the outer ring, as described above. Thus, when the rolling bearing is replaced, the sensor unit also needs to be replaced. From a different point of view, the sensor unit cannot be reused in the bearing equipped with a rotation sensor disclosed in PTL 1.

The present invention has been made in view of the above-described problems of the conventional art. More specifically, the present invention provides a bearing device in which a sensor unit is reusable.

Solution to Problem

A bearing device of the present invention includes: a rolling bearing including a rotation ring, a fixed ring, and a rolling element; a preload applying member; and a sensor unit. The rotation ring has a rotation ring raceway surface extending in a circumferential direction. The fixed ring has a fixed ring raceway surface extending in the circumferential direction and facing the rotation ring raceway surface with a space therebetween in a radial direction. The rolling element is disposed between the rotation ring raceway surface and the fixed ring raceway surface. The preload applying member applies a preload to the rolling bearing in an axial direction. The sensor unit is detachably attached to one of the fixed ring and the preload applying member, the sensor unit including a sensor that detects a state of rotation of the rotation ring.

In the bearing device, the rolling bearing may further include a first seal member. The fixed ring may further have: a first width surface facing the preload applying member; and a second width surface opposite to the first width surface. The fixed ring may further have a first circumferential surface including the fixed ring raceway surface. The rotation ring may further have a second circumferential surface including the rotation ring raceway surface. The first circumferential surface may be provided with a first annular groove extending in the circumferential direction, the first annular groove being located between a plurality of the rolling elements and the second width surface in the axial direction. The first seal member may be inserted into the first annular groove so as to close a space between the first circumferential surface and the second circumferential surface from a side of the second width surface. Grease may be enclosed in the space between the first circumferential surface and the second circumferential surface.

In the bearing device, the sensor unit may be disposed inside the preload applying member and detachably attached to the preload applying member.

In the bearing device, the sensor unit may further have an external annular ring. The external annular ring may include: a first annular portion extending in the circumferential direction; and a plurality of first claw portions extending from the first annular portion and arranged at intervals in the circumferential direction. The sensor unit may be detachably attached to the fixed ring as the plurality of first claw portions elastically deform to be engaged in the first circumferential surface.

The bearing device may further include a magnetic ring. The magnetic ring may be attached to the rotation ring. The magnetic ring may be magnetized alternately with an N pole and an S pole in the circumferential direction. The sensor may be a magnetic sensor that detects a state of rotation of the rotation ring based on a change in a magnetic field from the magnetic ring, the change resulting from rotation of the rotation ring.

In the bearing device, the magnetic ring may include a cored bar. The cored bar may include: a second annular portion extending in the circumferential direction; and a plurality of second claw portions extending from the second annular portion and arranged at intervals in the circumferential direction. The magnetic ring may be detachably attached to the rotation ring as the plurality of second claw portions elastically deform to be engaged in the second circumferential surface.

In the bearing device, the rolling bearing may further include a second seal member. The first circumferential surface may be provided with a second annular groove extending in the circumferential direction, the second annular groove being located between a plurality of the rolling elements and the first width surface in the axial direction. The second seal member may be inserted into the second annular groove so as to close the space between the first circumferential surface and the second circumferential surface from a side of the first width surface.

Advantageous Effects of Invention

According to the bearing device of the present invention, the sensor unit can be reused.

DESCRIPTION OF EMBODIMENTS

Figure 1A:
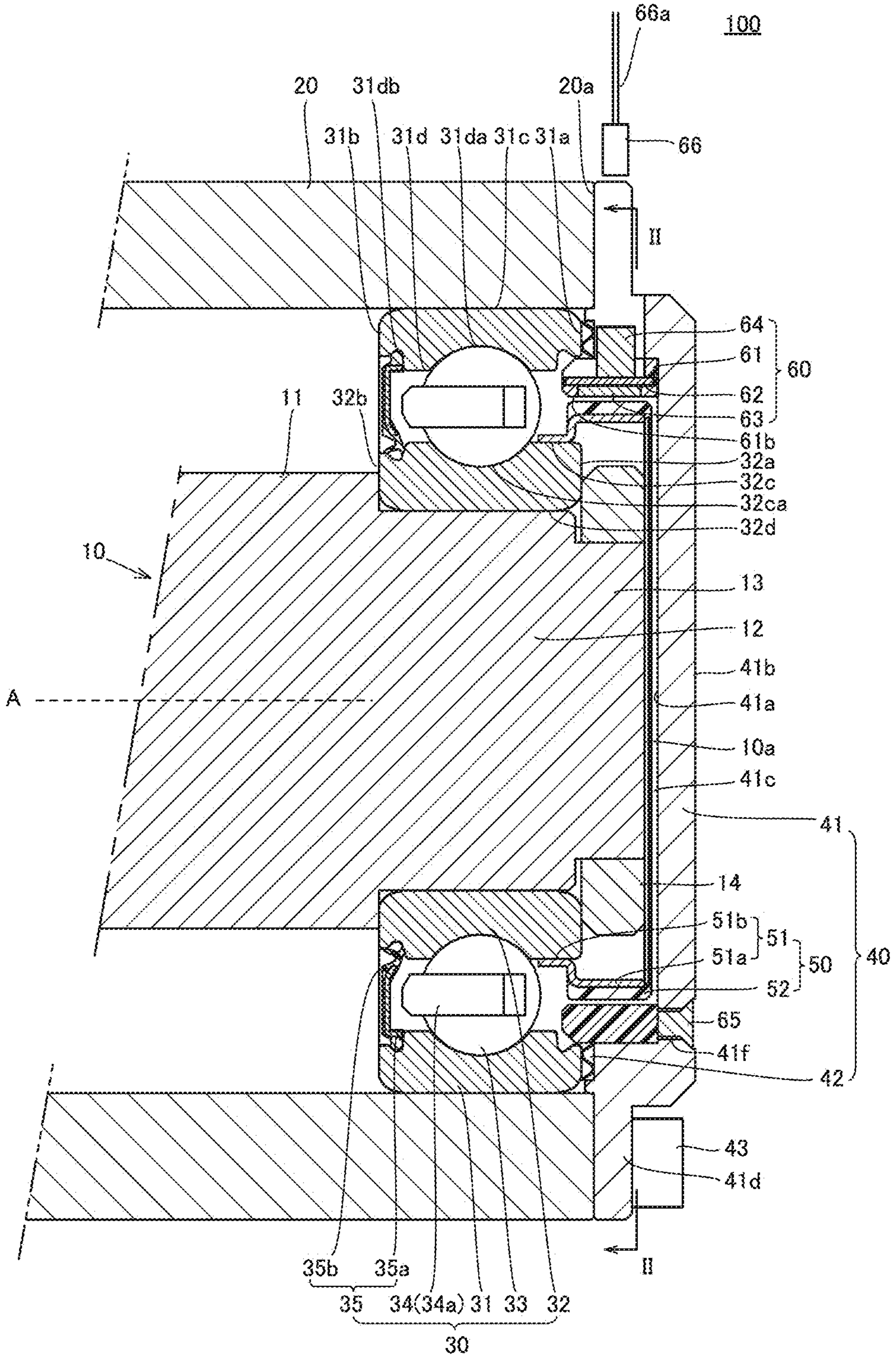
FIG. 1A is a cross-sectional view of a bearing device 100.

Embodiments of the present invention will be hereinafter described in detail with reference to the accompanying drawings, in which the same or corresponding portions are denoted by the same reference characters, and the description thereof will not be repeated.

First Embodiment

A bearing device according to the first embodiment will be hereinafter described. The bearing device according to the first embodiment is referred to as a bearing device 100.

<Configuration of Bearing Device 100>

The following describes a configuration of bearing device 100.

Figure 1B:
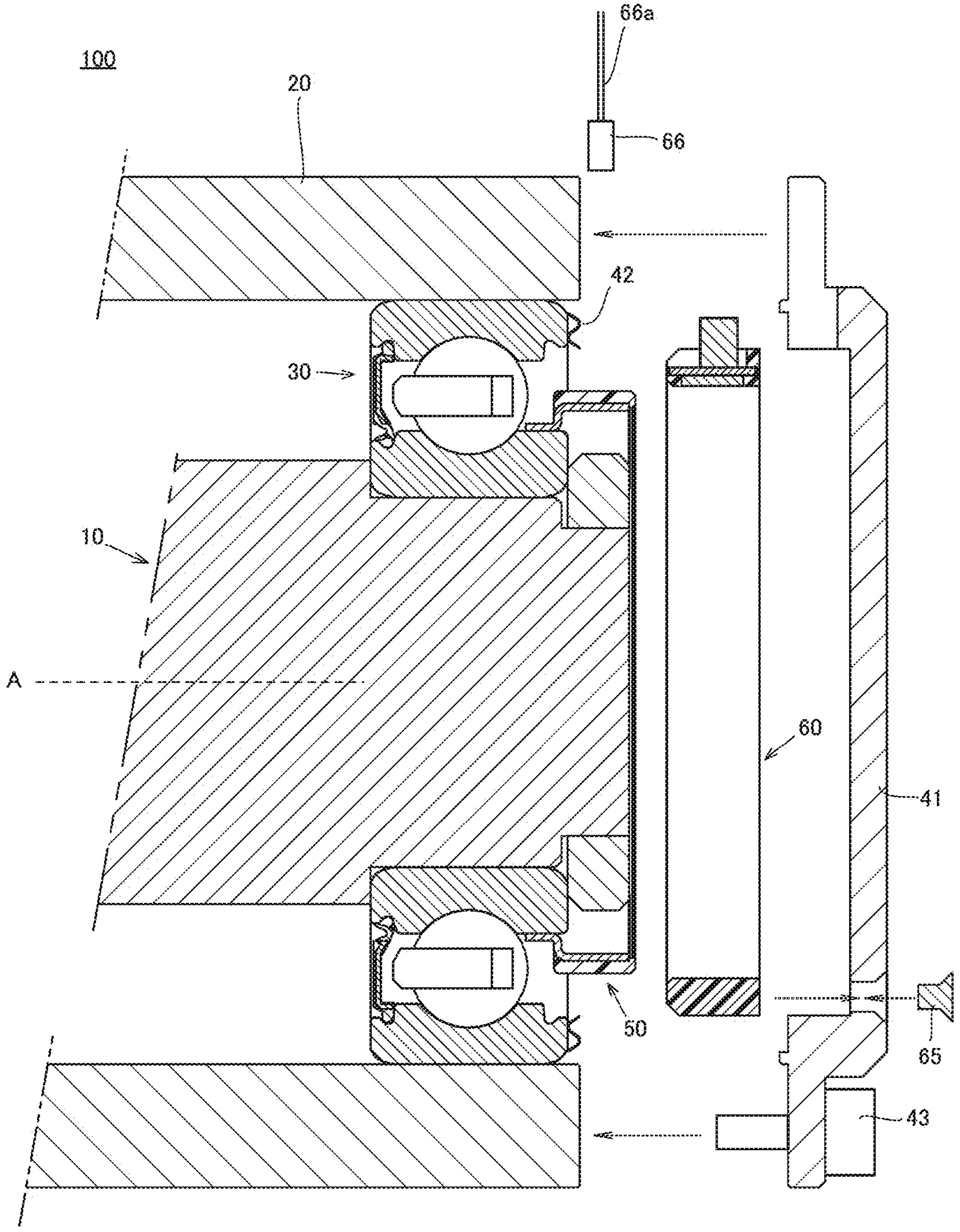
FIG. 1B is a cross-sectional view of bearing device 100 in a state in which a sensor unit 60 has been removed.
Figure 2:
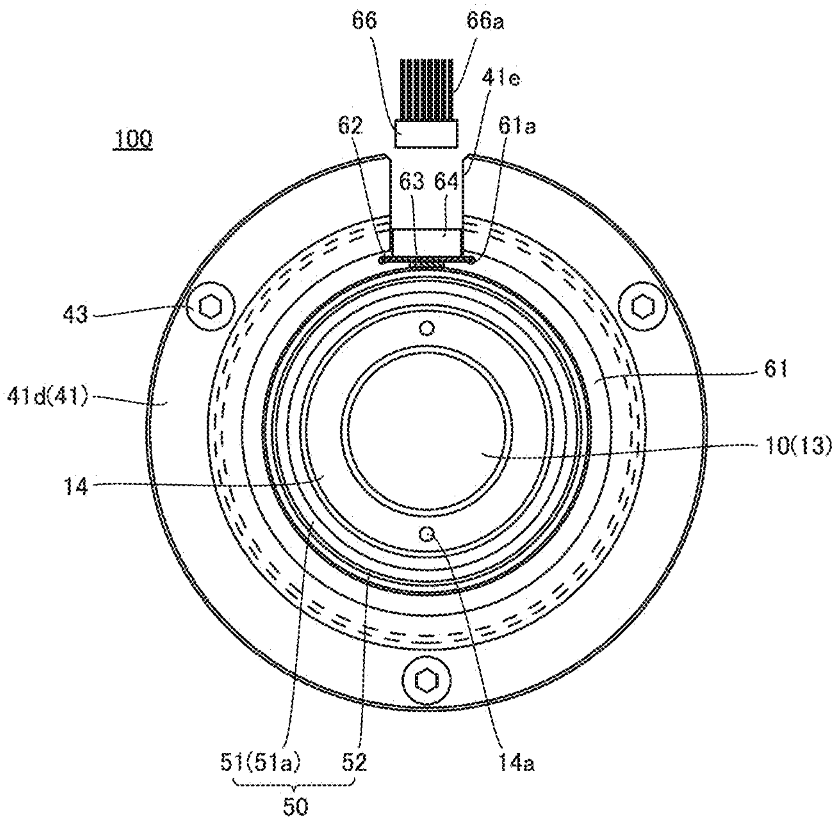
FIG. 2 is a cross-sectional view taken along II-II in FIG. 1A.

FIG. 1A is a cross-sectional view of bearing device 100. FIG. 1B is a cross-sectional view of bearing device 100 in the state in which a sensor unit 60 has been removed. FIG. 2 is a cross-sectional view taken along II-II in FIG. 1A. As shown in FIGS. 1A, 1B, and 2, bearing device 100 includes a rotation shaft 10, a housing 20, a rolling bearing 30, a preload applying member 40, a magnetic ring 50, and sensor unit 60.

The central axis of rotation shaft 10 is referred to as a central axis A. Rotation shaft 10 is rotated about central axis A. The direction along central axis A is referred to as an axial direction. The direction extending along central axis A and orthogonal to the axial direction is referred to as a radial direction. The direction along a circumference centered on central axis A is referred to as a circumferential direction.

An end of rotation shaft 10 in the axial direction is referred to as an end 10*a*. Rotation shaft 10 has a body portion 11, a reduced-diameter portion 12, and a reduced-diameter portion 13. Reduced-diameter portions 12 and 13 are located at an end portion on the end 10*a* side. Body portion 11 is larger in outer diameter than reduced-diameter portions 12 and 13. Reduced-diameter portion 13 is located closer to end 10*a* than reduced-diameter portion 12 is. Reduced-diameter portion 13 is smaller in outer diameter than reduced-diameter portion 12. In other words, the outer diameter surface of rotation shaft 10 is provided with steps at the boundary between body portion 11 and reduced-diameter portion 12 and at the boundary between reduced-diameter portions 12 and 13.

Housing 20 extends in the axial direction. Rotation shaft 10 is accommodated inside housing 20. Housing 20 has an end 20*a* in the axial direction. Housing 20 is opened at end 20*a*.

Rolling bearing 30 is, for example, a deep groove ball bearing. However, rolling bearing 30 is not limited thereto. Rolling bearing 30 includes an outer ring 31, an inner ring 32, a plurality of rolling elements 33, a cage 34, and a seal member 35. Rolling bearing 30 is disposed inside housing 20 and rotatably supports rotation shaft 10 about central axis A.

Outer ring 31 is an annular member extending in the circumferential direction. Outer ring 31 has a width surface 31*a*, a width surface 31*b*, an outer diameter surface 31*c*, and an inner diameter surface 31*d*. Width surfaces 31*a* and 31*b* are end surfaces of outer ring 31 in the axial direction. Width surface 31*b* is located opposite to width surface 31*a* in the axial direction.

Outer diameter surface 31*c* extends in the circumferential direction. Outer diameter surface 31*c* faces opposite to central axis A. Outer ring 31 is fitted into housing 20 at outer diameter surface 31*c*. One end and the other end of outer diameter surface 31*c* in the axial direction are contiguous to width surface 31*a* and width surface 31*b*, respectively.

Inner diameter surface 31*d* extends in the circumferential direction. Inner diameter surface 31*d* faces toward central axis A. In other words, inner diameter surface 31*d* is opposite to outer diameter surface 31*c* in the radial direction. One end and the other end of inner diameter surface 31*d* in the axial direction are contiguous to width surface 31*a* and width surface 31*b*, respectively.

Inner diameter surface 31*d* has an outer ring raceway surface 31*da*. Outer ring raceway surface 31*da* is a portion of inner diameter surface 31*d* that contacts rolling element 33. Outer ring raceway surface 31*da* is located in a central portion of inner diameter surface 31*d* in the axial direction. Outer ring raceway surface 31*da* extends in the circumferential direction. In a cross-sectional view orthogonal to the circumferential direction, outer ring raceway surface 31*da* has a partial arc shape.

Inner ring 32 is an annular member extending in the circumferential direction. Inner ring 32 has a width surface 32*a*, a width surface 32*b*, an outer diameter surface 32*c*, and an inner diameter surface 32*d*. Width surfaces 32*a* and 32*b* are end surfaces of inner ring 32 in the axial direction. Width surface 32*b* is opposite to width surface 32*a* in the axial direction. Width surface 32*a* is in contact with a nut 14 screwed into reduced-diameter portion 13. Note that nut 14 is rotated about central axis A through the use of a fastening hole 14*a* and thereby screwed into reduced-diameter portion 13. Width surface 32*b* is in contact with a step between body portion 11 and reduced-diameter portion 12. Thereby, the position of inner ring 32 in the axial direction is fixed. In order to prevent loosening of nut 14, a washer may be disposed between nut 14 and inner ring 32, or a locking nut may be used as nut 14. Inner ring 32 may be press-fitted and fixed onto the outer diameter surface of rotation shaft 10, which may be combined with fastening by nut 14.

Outer diameter surface 32*c* extends in the circumferential direction. Outer diameter surface 32*c* faces opposite to central axis A. Outer diameter surface 32*c* faces inner diameter surface 31*d* with a space therebetween in the radial direction. One end and the other end of outer diameter surface 32*c* in the axial direction are contiguous to width surface 32*a* and width surface 32*b*, respectively.

Outer diameter surface 32*c* has an inner ring raceway surface 32*ca*. Inner ring raceway surface 32*ca* is a portion of outer diameter surface 32*c* that contacts rolling element 33. Inner ring raceway surface 32*ca* is located in a central portion of outer diameter surface 32*c* in the axial direction. Inner ring raceway surface 32*ca* faces outer ring raceway surface 31*da* in the radial direction. Inner ring raceway surface 32*ca* extends in the circumferential direction. In a cross-sectional view orthogonal to the circumferential direction, inner ring raceway surface 32*ca* has a partial arc shape.

Inner diameter surface 32*d* extends in the circumferential direction. Inner diameter surface 32*d* faces toward central axis A. In other words, inner diameter surface 32*d* is opposite to outer diameter surface 32*c* in the radial direction. One end and the other end of inner diameter surface 32*d* in the axial direction are contiguous to width surface 32*a* and width surface 32*b*, respectively. Inner ring 32 is fitted into rotation shaft 10 at inner diameter surface 32*d*. More specifically, inner ring 32 is fitted into reduced-diameter portion 12.

Rolling element 33 is, for example, a ball (i.e., rolling element 33 has a spherical shape). Rolling element 33 is disposed between inner diameter surface 31*d* and outer diameter surface 32*c*. More specifically, rolling element 33 is disposed between outer ring raceway surface 31*da* and inner ring raceway surface 32*ca*. The plurality of rolling elements 33 are arranged in the circumferential direction.

Cage 34 is an annular member that holds the plurality of rolling elements 33. Cage 34 includes a plurality of annular portions 34*a* and a plurality of support portions 34*b* (not shown). In other words, cage 34 is, for example, a crown-type cage. The plurality of annular portions 34*a* are arranged at intervals in the circumferential direction. Each annular portion 34*a* holds rolling element 33. Annular portion 34*a* is opened, for example, on the width surface 31*a* (width surface 32*a*) side. Support portion 34*b* connects two adjacent annular portions 34*a*.

Inner diameter surface 31*d* is provided with an annular groove 31*db*. Annular groove 31*db* extends in the circumferential direction. Annular groove 31*db* is provided between outer ring raceway surface 31*da* and width surface 31*b* (between rolling element 33 and width surface 31*b*) in the axial direction.

Seal member 35 is an annular member. Seal member 35 includes a cored bar 35*a* and a rubber 35*b*. Cored bar 35*a* is formed, for example, by press molding. Rubber 35*b* is bonded to cored bar 35*a*. Rubber 35*b* is, for example, an oil-resistant rubber (NBR, HNBR, FKM, ACM, or the like) vulcanized and bonded to cored bar 35*a*. Seal member 35 may be formed by applying an anti-rust coating (for example, tin plating, zinc plating, or the like) onto the surface of the press-molded cored bar.

Seal member 35 is inserted at its outer peripheral edge into annular groove 31*db*. Seal member 35 is in contact at its inner peripheral edge with outer diameter surface 32*c*. Thereby, the space (a bearing space) between inner diameter surface 31*d* and outer diameter surface 32*c* is closed from the width surface 31*b* side to suppress an exposure of grease to the outside of the bearing space and an intrusion of foreign matter into the bearing space. Although not shown, grease is supplied into the bearing space. The grease is preferably supplied from the width surface 31*a* (width surface 32*a*) side so as to flow between two adjacent rolling elements 33.

Preload applying member 40 includes a lid 41 and a wave washer 42. Lid 41 has a first surface 41*a* and a second surface 41*b*. First surface 41*a* and second surface 41*b* are end surfaces of lid 41 in the axial direction. First surface 41*a* faces end 20*a*. Second surface 41*b* is opposite to first surface 41*a*.

Lid 41 has a recess 41*c*. Recess 41*c* has, for example, a circular shape when viewed in the axial direction. Recess 41*c* is located in a central portion of lid 41 in the radial direction. First surface 41*a* of recess 41*c* (i.e., a bottom surface of recess 41*c*) is spaced apart from end 20*a*. A portion around recess 41*c* in the radial direction is referred to as a peripheral edge portion 41*d*. First surface 41*a* in peripheral edge portion 41*d* is in contact with the end surface on the end 20*a* side.

Although not shown, peripheral edge portion 41*d* is provided with a plurality of through holes penetrating peripheral edge portion 41*d* in a thickness direction (the axial direction). Although not shown, an end surface of housing 20 on the end 20*a* side is provided with a bolt hole extending in the axial direction. A bolt 43 is inserted through the above-mentioned through holes and screwed into the bolt hole, so that lid 41 is attached to housing 20. Lid 41 is provided with an opening 41*e*. Opening 41*e* is in communication with the inside of recess 41*c*.

Wave washer 42 is disposed between first surface 41*a* on peripheral edge portion 41*d* and width surface 31*a*. Repulsive force from wave washer 42 is applied to outer ring 31. This force is transmitted sequentially to rolling element 33 and inner ring 32, to thereby appropriately maintain the gap between rolling element 33 and each of outer ring 31 and inner ring 32. Thereby, the bearing rigidity increases to allow for high-speed rotation and to improve the rotation accuracy and the positioning accuracy.

Note that the preload is applied to rolling bearing 30 not necessarily only by wave washer 42. The preload may be applied to rolling bearing 30, for example, by adjusting the gap between width surface 31*a* and lid 41 in the axial direction or by adjusting the dimension of a hollow ring in the axial direction.

Magnetic ring 50 includes a cored bar 51 and a magnetic rubber 52. Cored bar 51 is an annular member extending in the circumferential direction. Cored bar 51 has an annular portion 51*a* and a press-fit portion 51*b*. Cored bar 51 is formed by press-molding (including drawing) a thin plate made of a metal material. The metal material is, for example, mild steel or stainless steel. Specific examples of mild steel include SPCC, SPCCT, SPCD, SPCE, and SPCEN. Specific examples of stainless steel include SUS430, SUS201, SUS304, SUS316, SUS321, SUS403, and SUS410. When cored bar 51 is formed by cutting machining, the metal material may be S45C or the like. Cored bar 51 may preferably be a magnetic body. Thereby, the magnetic properties can be improved.

Annular portion 51*a* and press-fit portion 51*b* extend in the circumferential direction. Annular portion 51*a* is partially disposed inside recess 41*c*. Press-fit portion 51*b* is contiguous to the end of annular portion 51*a* on the side opposite to lid 41. Annular portion 51*a* is larger in inner diameter and outer diameter than press-fit portion 51*b*. Inner ring 32 is press-fitted into the inner diameter surface of press-fit portion 51*b*. Thereby, magnetic ring 50 is attached to inner ring 32 and rotates around central axis A together with inner ring 32.

Magnetic rubber 52 is made of a rubber material, for example, kneaded with magnetic powder. Specific examples of the rubber material include NBR, HNBR, FKM, and ACM. Specific examples of the magnetic powder include ferrite-based magnetic powder, neodymium-based magnetic powder, and samarium-based magnetic powder. For example, a rubber material kneaded with magnetic powder is bonded onto the outer diameter surface of annular portion 51*a* during vulcanization, with the result that magnetic rubber 52 is disposed on the outer diameter surface of annular portion 51*a*. At this time, an adhesive is preferably applied in advance on the outer diameter surface of annular portion 51*a*.

Magnetic rubber 52 is magnetized alternately with N poles and S poles in the circumferential direction. Magnetic rubber 52 is magnetized, for example, by the following method. Firstly, magnetic ring 50 is attached to a magnetizing device. The magnetizing device includes a rotary chuck, a magnetizing yoke, and a magnetizing coil. Magnetic ring 50 is attached to the rotary chuck. The magnetizing coil is wound around the magnetizing yoke. In the state in which magnetic ring 50 is attached to the rotary chuck, the magnetizing coil faces magnetic rubber 52 with a space therebetween.

Secondly, the rotary chuck is rotated together with magnetic ring 50. At this time, a current is caused to flow through the magnetizing coil. The direction in which this current flows is changed in synchronization with the rotation of the rotary chuck. Thereby, magnetic rubber 52 is magnetized alternately with N poles and S poles in the circumferential direction. Note that magnetic rubber 52 may be magnetized alternately with N poles and S poles in the circumferential direction by providing a plurality of magnetizing yokes and a plurality of magnetizing coils arranged such that the currents flowing through two adjacent magnetizing coils flow in opposite directions. In this case, the magnetizing device completes magnetization in a short time period without having to rotate the magnetic ring. When using such a magnetization method, the magnetic powder is preferably neodymium-based or samarium-based magnetic powder.

Sensor unit 60 includes a sensor housing 61, a circuit board 62, and a magnetic sensor 63 and a connector 64 that are mounted on circuit board 62.

Sensor housing 61 is an annular member extending in the circumferential direction. Sensor housing 61 is made, for example, of a thermoplastic resin such as PPS containing a filler such as glass fibers or calcium carbonate. Thereby, the stability of the dimensions and the like with respect to an environmental temperature is improved. Sensor housing 61 is at least partially accommodated inside recess 41*c*. Thus, sensor unit 60 is to be disposed inside preload applying member 40.

A screw 65 is inserted to pass through a through hole 41*f* provided in lid 41 and is screwed into a screw hole (not shown) provided in sensor housing 61. Thereby, sensor unit 60 is detachably attached to preload applying member 40. By removing screw 65 from sensor unit 60, sensor unit 60 can be detached from preload applying member 40.

Circuit board 62 is made, for example, of an epoxy resin containing glass fibers. The material forming circuit board 62 preferably has: compressive strength of 340 MPa or more and 500 MPa or less; and bending strength of 390 MPa or more and 550 MPa or less. This increases the rigidity of circuit board 62 and improves the accuracy of rotation detection. Circuit board 62 may be a single-layer board or a multilayer board. In the case where circuit board 62 is a multilayer board, circuit board 62 can be reduced in size.

Circuit board 62 is held by sensor housing 61. More specifically, circuit board 62 is engaged in a groove 61*a* provided in sensor housing 61, so that the position of circuit board 62 is fixed in the axial direction and the radial direction. At least a part of circuit board 62 is exposed to the outside through opening 41*e*.

Magnetic sensor 63 is mounted on circuit board 62. Sensor housing 61 is provided with a through hole 61*b* through which magnetic sensor 63 is exposed to the inside of recess 41*c*. Magnetic sensor 63 faces magnetic rubber 52 with a space therebetween in the radial direction.

Figure 3:
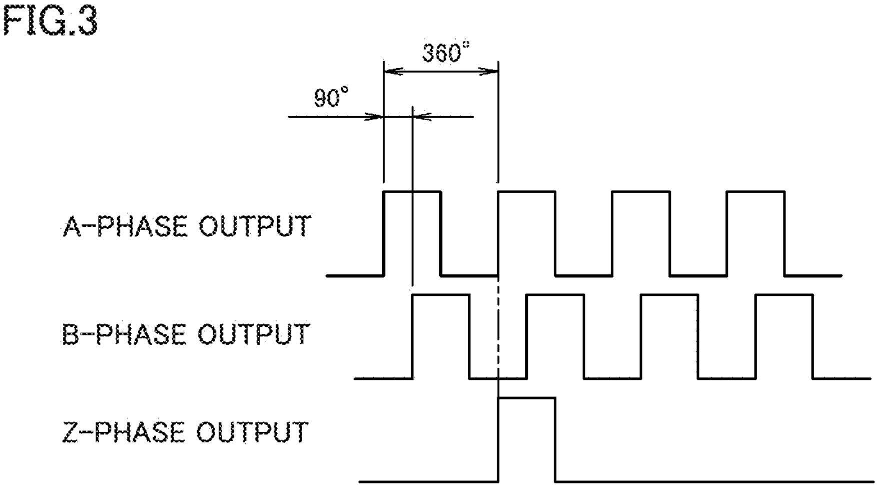
FIG. 3 is an example of an electrical signal output from a magnetic sensor 63.

Magnetic sensor 63 detects the state of rotation of inner ring 32 based on a change in magnetic field from magnetic ring 50, the change resulting from the rotation of inner ring 32. More specifically, magnetic sensor 63 outputs an electrical signal corresponding to a change in magnetic field from magnetic ring 50 that results from the rotation of inner ring 32. FIG. 3 is an example of an electrical signal output from magnetic sensor 63. As shown in FIG. 3, the electrical signal output from magnetic sensor 63 is, for example, an incremental output including an origin signal. However, the electrical signal from magnetic sensor 63 may be output in an absolute form.

Connector 64 is electrically connected to magnetic sensor 63. Connector 64 is mounted on a portion of circuit board 62 that is exposed through opening 41*e*. A connector 66 is connected to connector 64. The electrical signal from magnetic sensor 63 is output to the outside through connectors 64 and 66 from an electric wire 66*a* connected to connector 66. Electric wire 66*a* may be connected to circuit board 62 not through connectors 64 and 66 but by soldering or the like.

Electronic components other than magnetic sensor 63 are also mounted on circuit board 62. Such electronic components include electronic components for attenuating or blocking harmful electrical noise from outside (for example, a common-mode filter, a single-mode filter, a resistor, a ceramic capacitor, a coil, a varistor, an inductor, a ceramic filter, an EMI filter, a ferrite bead, and the like). In order to protect circuit board 62, circuit board 62 may be covered with a thermosetting resin (epoxy, urethane, or the like). The thermosetting resin may be in the form of a sheet or a liquid. Circuit board 62 may be provided with a moisture-resistant coating in order to prevent migration in magnetic sensor 63 and other electronic components. Lead-free solder is preferably used for connecting circuit board 62 to magnetic sensor 63 and other electronic components.

Effects of Bearing Device 100

The following describes the effects of bearing device 100 in comparison with a bearing device according to a comparative example. The bearing device according to the comparative example is referred to as a bearing device 200.

Figure 4:
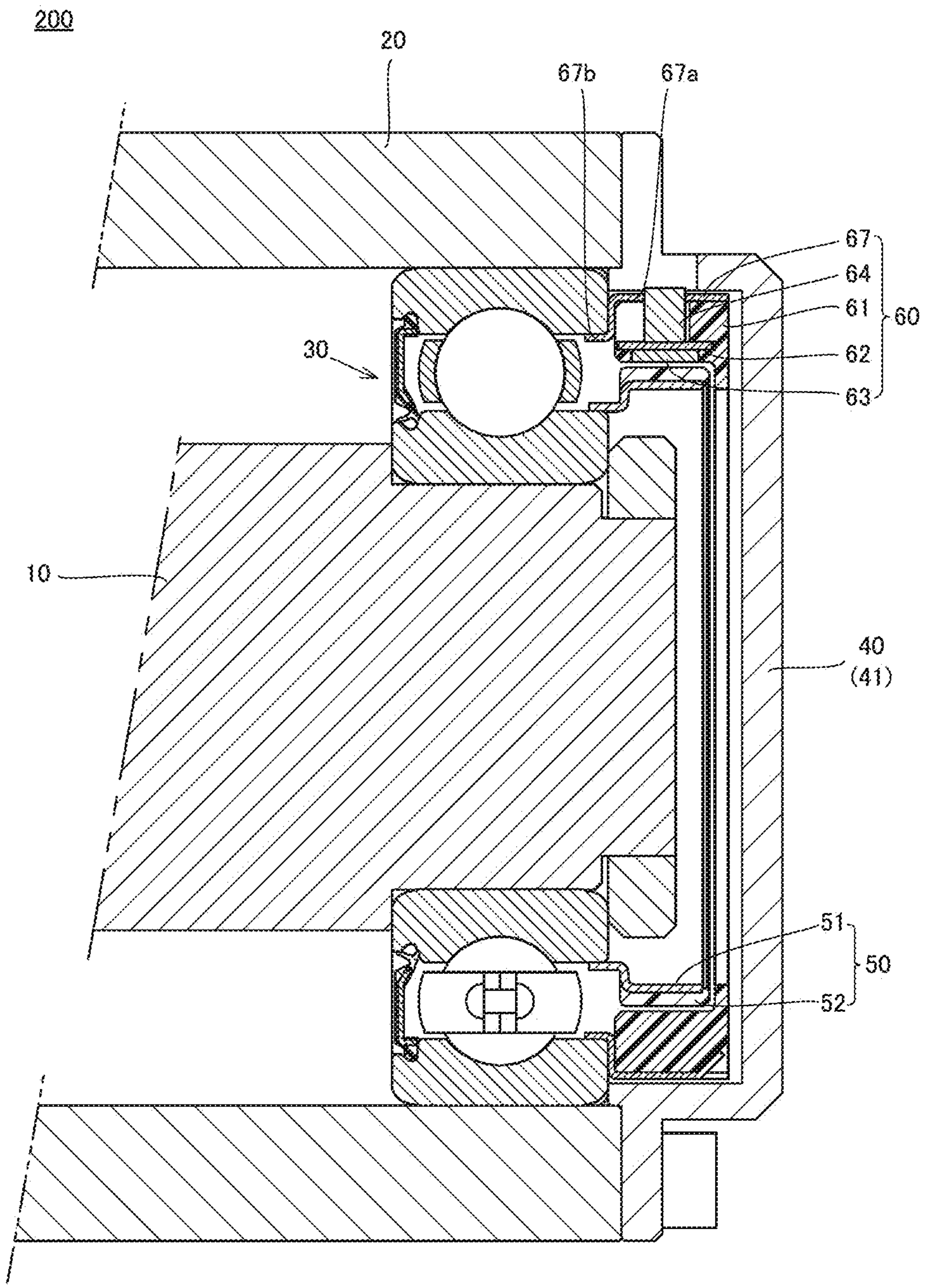
FIG. 4 is a cross-sectional view of a bearing device 200.

In bearing device 200, sensor unit 60 is attached to preload applying member 40 not in a detachable manner. FIG. 4 is a cross-sectional view of bearing device 200. As shown in FIG. 4, in bearing device 200, sensor unit 60 has an external annular ring 67. External annular ring 67 is an annular member extending in the circumferential direction.

External annular ring 67 has an annular portion 67*a* and a press-fit portion 67*b* in the axial direction. Annular portion 67*a* and press-fit portion 67*b* extend in the circumferential direction. Annular portion 67*a* is partially disposed inside recess 41*c*. Sensor housing 61 is attached to an inner diameter surface of annular portion 67*a*. Press-fit portion 67*b* is contiguous to an end of annular portion 67*a* on the side opposite to lid 41. Annular portion 67*a* is larger in inner diameter and outer diameter than press-fit portion 67*b*. Press-fit portion 67*b* is press-fitted into inner diameter surface 31*d*. Therefore, in bearing device 200, sensor unit 60 is undetachable from outer ring 31, and thus, sensor unit 60 cannot be detached and reused when rolling bearing 30 is replaced.

On the other hand, in bearing device 100, sensor unit 60 is detachably attached onto preload applying member 40 (lid 41) by screwing, and therefore, sensor unit 60 can be reused when rolling bearing 30 is replaced. Further, in bearing device 100, external annular ring 67 is not necessary for attaching sensor unit 60, and therefore, lid 41 can be reduced in dimension in the axial direction.

Second Embodiment

A bearing device according to the second embodiment will be hereinafter described. The bearing device according to the second embodiment is referred to as a bearing device 100A. The following mainly describes the differences from bearing device 100, and the same description will not be repeated.

Figure 5:
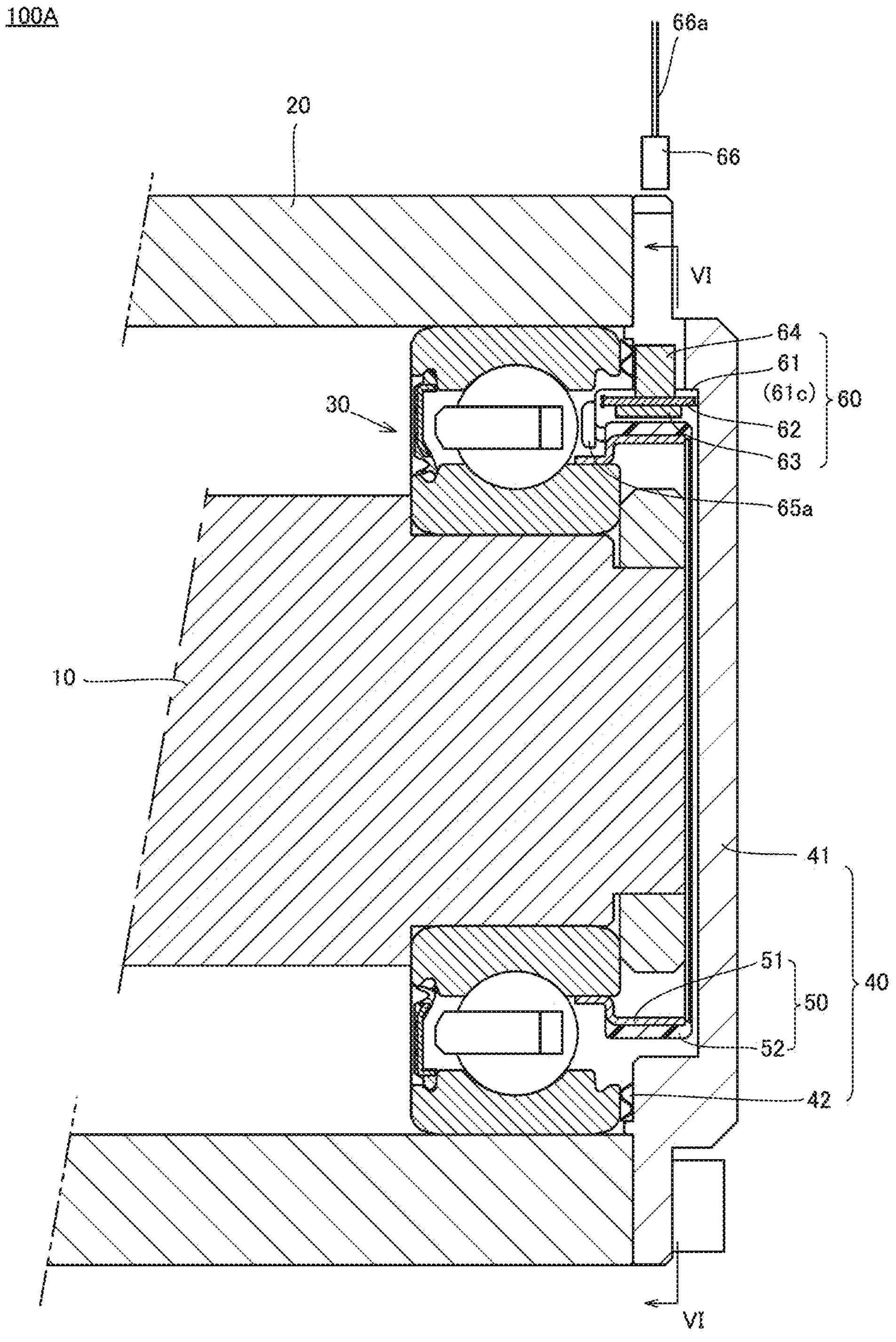
FIG. 5 is a cross-sectional view of a bearing device 100A.
Figure 6:
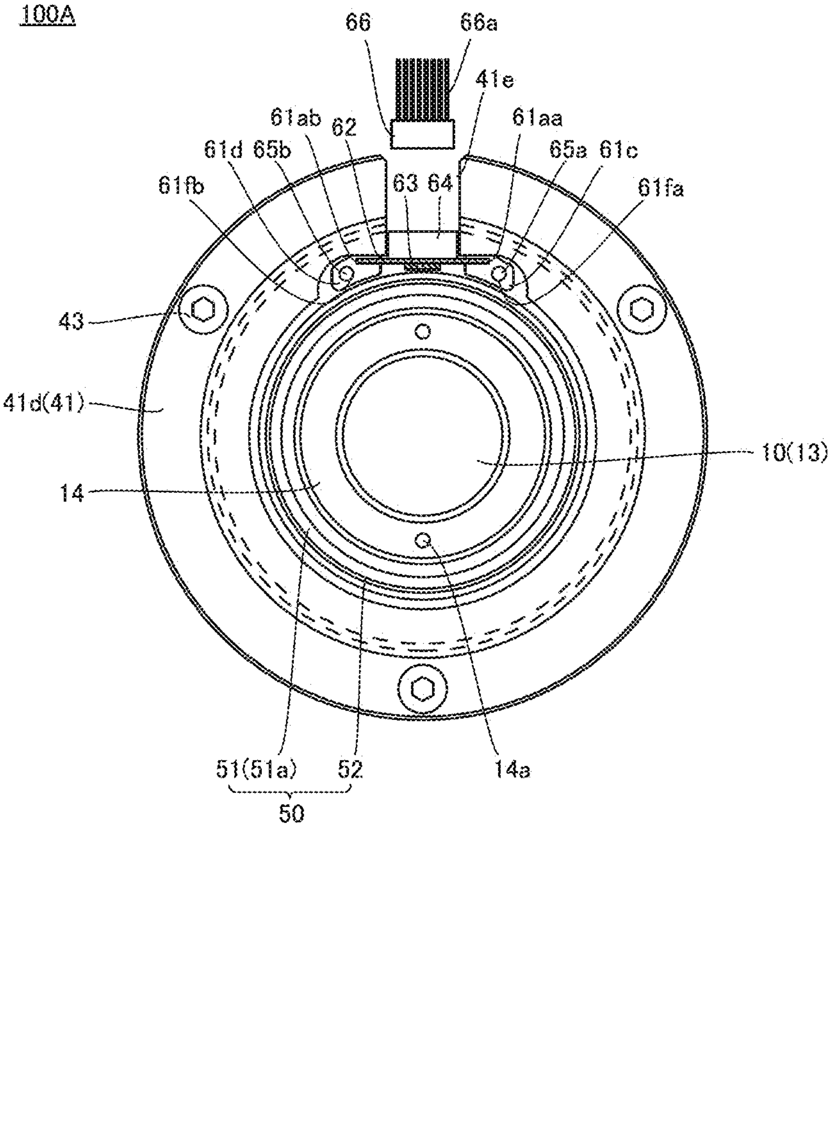
FIG. 6 is a cross-sectional view taken along VI-VI in FIG. 5.

FIG. 5 is a cross-sectional view of bearing device 100A. FIG. 6 is a cross-sectional view taken along VI-VI in FIG. 5. As shown in FIGS. 5 and 6, in bearing device 100A, sensor housing 61 does not have an annular shape extending in the circumferential direction.

More specifically, in bearing device 100A, sensor housing 61 is formed of a first member 61*c* and a second member 61*d*. In bearing device 100A, screws 65*a* and 65*b* are used instead of screw 65. In bearing device 100A, through holes 61*fa* and 61*fb* are provided instead of through hole 41*f*. Through hole 61*fa* and through hole 61*fb* are provided in first member 61*c* and second member 61*d*, respectively. Screw 65*a* is inserted to pass through the through hole 61*fa* and is screwed into a screw hole (not shown) provided in lid 41. Screw 65*b* is inserted to pass through the through hole 61*fb* and is screwed into a screw hole (not shown) provided in lid 41. Thereby, sensor housing 61 (first member 61*c* and second member 61*d*) is detachably attached to lid 41.

First member 61*c* and second member 61*d* are provided with a groove 61*aa* and a groove 61*ab*, respectively. Circuit board 62 is inserted into grooves 61*aa* and 61*ab* and thereby held by sensor housing 61 (first member 61*c* and second member 61*d*). Also in bearing device 100A, sensor unit 60 is detachably attached to preload applying member 40 (lid 41), and therefore, sensor unit 60 can be reused when rolling bearing 30 is replaced.

Third Embodiment

A bearing device according to the third embodiment will be hereinafter described. The bearing device according to the third embodiment is referred to as a bearing device 100B. The following mainly describes the differences from bearing device 100, and the same description will not be repeated.

Figure 7:
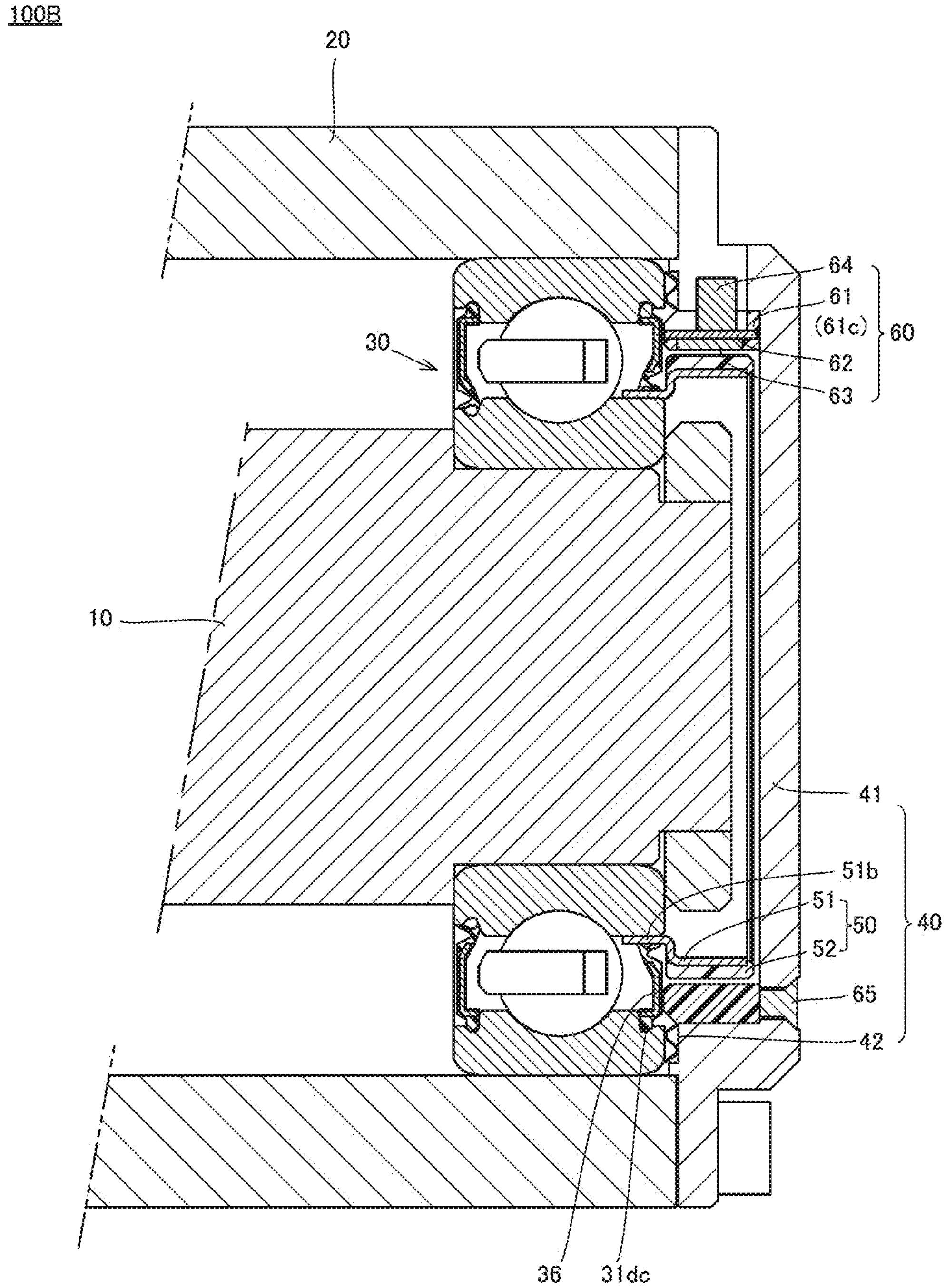
FIG. 7 is a cross-sectional view of a bearing device 100B.

FIG. 7 is a cross-sectional view of bearing device 100B. As shown in FIG. 7, in bearing device 100B, inner diameter surface 31*d* is provided with an annular groove 31*dc*. Annular groove 31*dc* extends in the circumferential direction. Annular groove 31*dc* is provided between outer ring raceway surface 31*da* and width surface 31*a* (between rolling element 33 and width surface 31*a*) in the axial direction.

In bearing device 100B, rolling bearing 30 further includes a seal member 36. Seal member 36 is inserted at its outer peripheral edge into annular groove 31*dc*. Seal member 36 is in contact at its inner peripheral edge with the outer diameter surface of cored bar 51 (press-fit portion 51*b*). Thereby, the bearing space is closed also from the width surface 31*a* side. Thus, in bearing device 100B, the exposure of grease to the outside of the bearing space and the intrusion of foreign matter into the bearing space are further suppressed.

Fourth Embodiment

A bearing device according to the fourth embodiment will be hereinafter described. The bearing device according to the fourth embodiment is referred to as a bearing device 100C. The following mainly describes the differences from bearing device 100B, and the same description will not be repeated.

Figure 8:
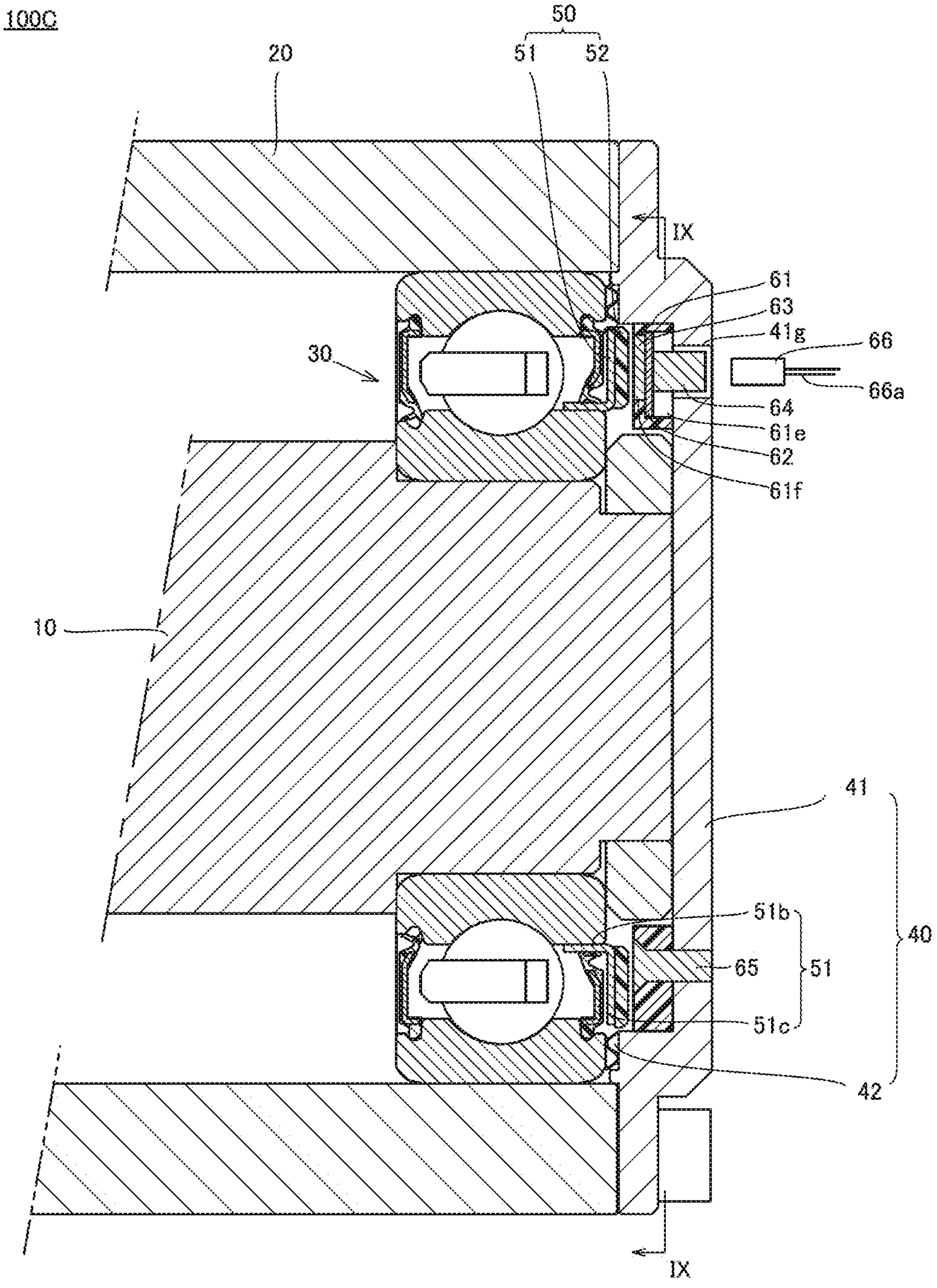
FIG. 8 is a cross-sectional view of a bearing device 100C.
Figure 9:
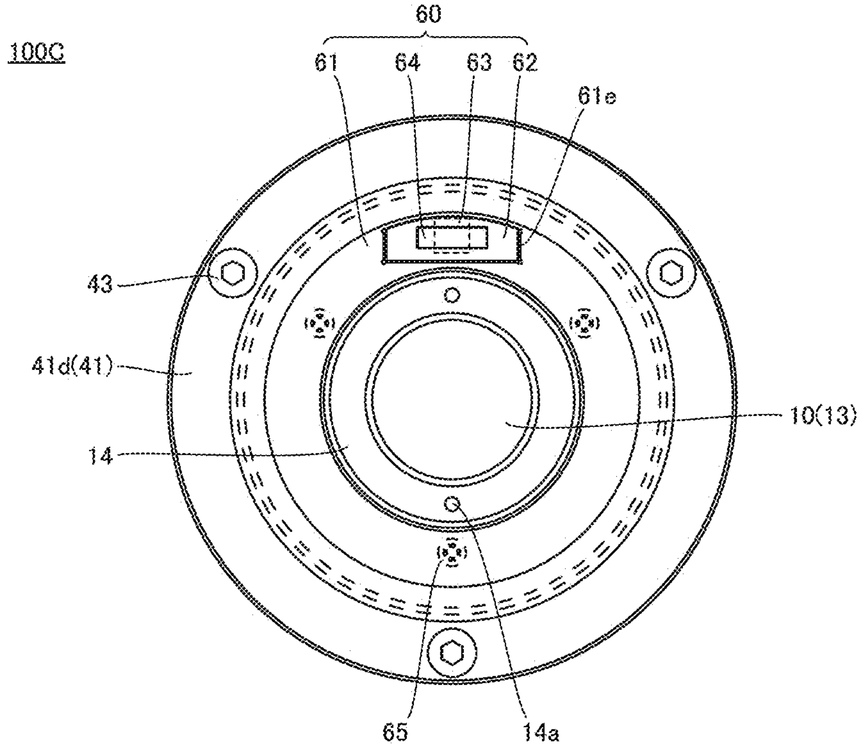
FIG. 9 is a cross-sectional view taken along IX-IX in FIG. 8.

FIG. 8 is a cross-sectional view of bearing device 100C. FIG. 9 is a cross-sectional view taken along IX-IX in FIG. 8. As shown in FIGS. 8 and 9, in bearing device 100C, cored bar 51 has an annular portion 51*c* instead of annular portion 51*a*. Annular portion 51*c* extends in the circumferential direction. The direction normal to a main surface of annular portion 51*c* corresponds to the axial direction. Magnetic rubber 52 is disposed on the main surface of annular portion 51*c* that faces toward lid 41.

In bearing device 100C, a recess 61*e* is provided in the surface of sensor housing 61 on the lid 41 side. Circuit board 62 is disposed inside recess 61*e* such that the direction normal to a main surface of circuit board 62 corresponds to the axial direction. Connector 64 is mounted on a main surface of circuit board 62 that faces toward lid 41. Magnetic sensor 63 is mounted on a main surface of circuit board 62 that faces opposite to lid 41. Sensor housing 61 is provided with a through hole 61*f* through which magnetic sensor 63 is exposed from a surface of sensor housing 61 on the side opposite to lid 41. In bearing device 100C, magnetic sensor 63 and magnetic rubber 52 face each other with a space therebetween in the axial direction. Lid 41 is provided with a through hole 41*g* through which connector 64 is exposed.

Fifth Embodiment

Figure 10A:
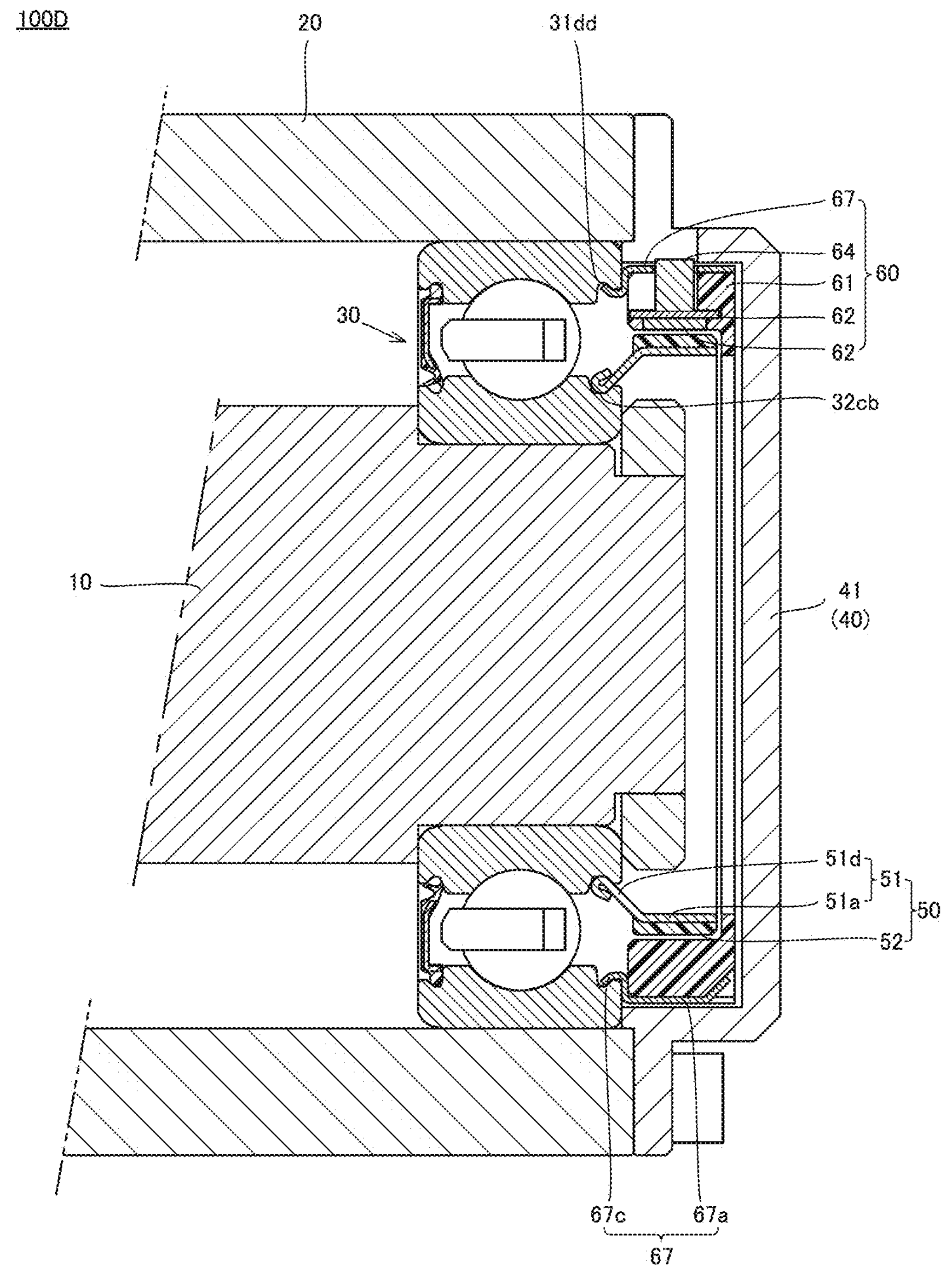
FIG. 10A is a cross-sectional view of a bearing device 100D.
Figure 10B:
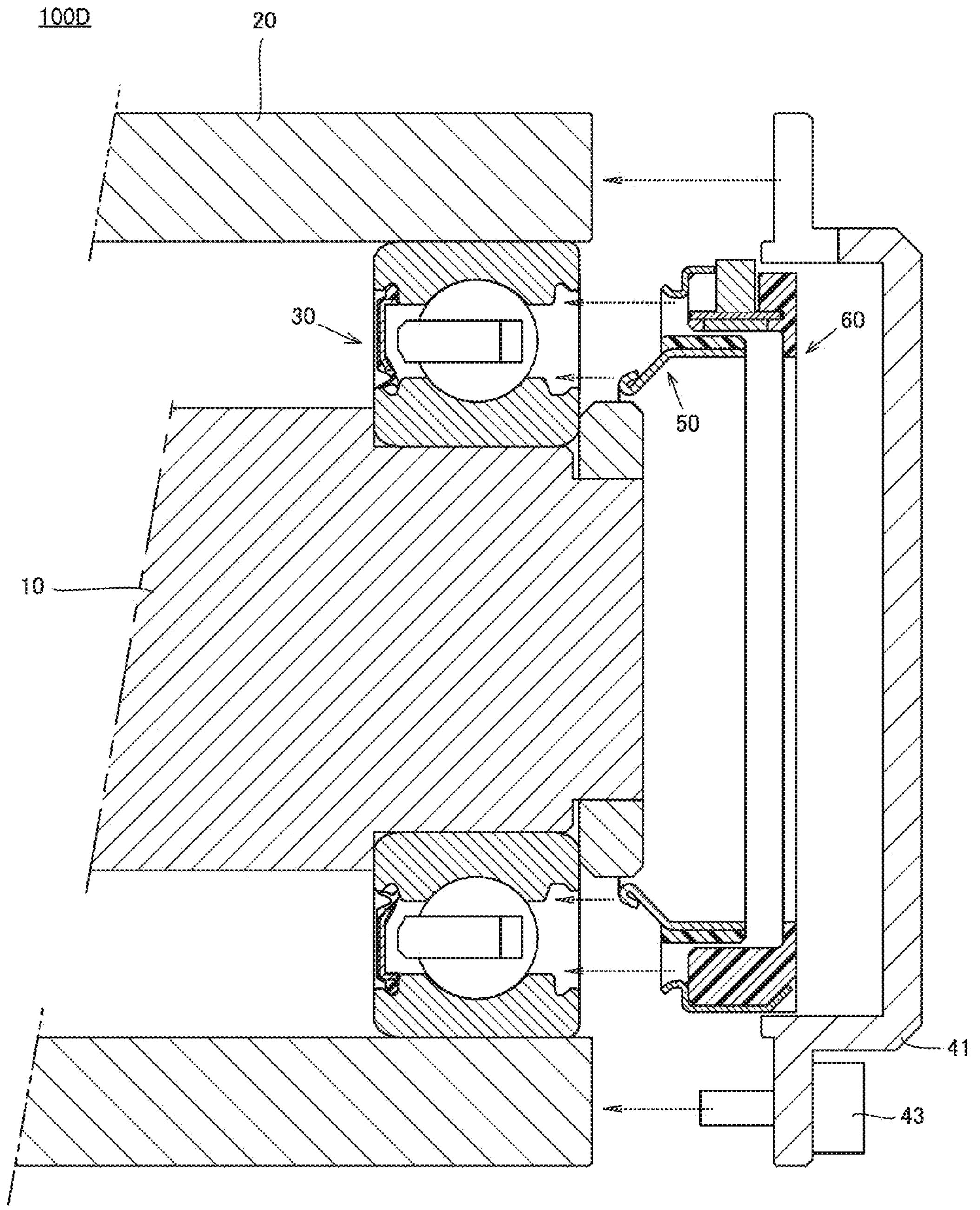
FIG. 10B is a cross-sectional view of bearing device 100D in a state in which a magnetic ring 50 and a sensor unit 60 have been removed.
Figure 11:
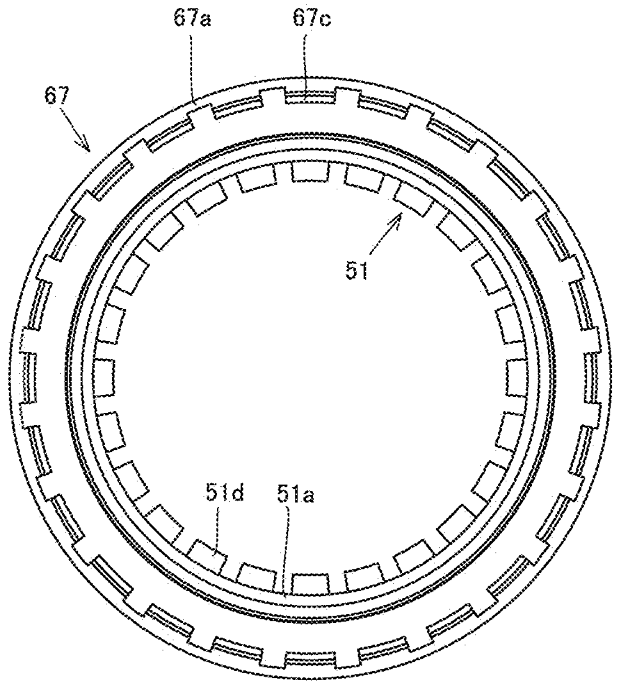
FIG. 11 is a front view of a cored bar 51 and an external annular ring 67.

A bearing device according to the fifth embodiment will be hereinafter described. The bearing device according to the fifth embodiment is referred to as a bearing device 100D. The following mainly describes the differences from bearing device 100, and the same description will not be repeated. FIG. 10A is a cross-sectional view of bearing device 100D. FIG. 10B is a cross-sectional view of bearing device 100D in the state in which magnetic ring 50 and sensor unit 60 have been removed. FIG. 11 is a front view of cored bar 51 and external annular ring 67.

As shown in FIGS. 10A, 10B, and 11, in bearing device 100D, sensor unit 60 is detachably attached not to preload applying member 40 (lid 41) but to outer ring 31. More specifically, in bearing device 100D, sensor unit 60 has external annular ring 67. External annular ring 67 has an annular portion 67*a* and a plurality of claw portions 67*c*.

Sensor housing 61 is attached to the inner diameter surface of annular portion 67*a*. The plurality of claw portions 67*c* are arranged in the circumferential direction. The plurality of claw portions 67*c* are preferably arranged at regular intervals in the circumferential direction. Each claw portion 67*c* extends radially inward from annular portion 67*a*. When the plurality of claw portions 67*c* are inserted into inner diameter surface 31*d*, these claw portions 67*c* once elastically deform to be reduced in diameter. Then, after these claw portions 67*c* are inserted into inner diameter surface 31*d*, they are increased in diameter again. In this way, the plurality of claw portions 67*c* elastically deform to be engaged in inner diameter surface 31*d*, and thereby, sensor unit 60 is detachably attached to outer ring 31. While the plurality of claw portions 67*c* are reduced in diameter, sensor unit 60 is pulled out from outer ring 31 and thereby can be detached from outer ring 31.

In bearing device 100D, inner diameter surface 31*d* is provided with an annular groove 31*dd*. Annular groove 31*dd* extends in the circumferential direction. Annular groove 31*dd* is provided between outer ring raceway surface 31*da* and width surface 31*a* (between rolling element 33 and width surface 31*a*) in the axial direction. Each claw portion 67*c* is preferably shaped to be folded back along the shape of inner diameter surface 31*d* between annular groove 31*dd* and width surface 31*a*.

In bearing device 100D, cored bar 51 includes annular portion 51*a* and a plurality of claw portions 51*d*. The plurality of claw portions 51*d* are arranged in the circumferential direction. The plurality of claw portions 51*d* are preferably arranged at regular intervals in the circumferential direction. Each claw portion 51*d* extends radially inward from annular portion 51*a*. When inner ring 32 is inserted, the plurality of claw portions 51*d* once elastically deform to be increased in diameter. Then, after inner ring 32 is inserted, these claw portions 51*d* are reduced in diameter again. In this way, the plurality of claw portions 51*d* elastically deform to be engaged in outer diameter surface 32*c*, and thereby, magnetic ring 50 is detachably attached to inner ring 32. While the plurality of claw portions 51*d* are increased in diameter, magnetic ring 50 is pulled out and thereby can be detached from inner ring 32.

In bearing device 100D, outer diameter surface 32*c* is provided with an annular groove 32*cb*. Annular groove 32*cb* extends in the circumferential direction. Annular groove 32*cb* is provided between inner ring raceway surface 32*ca* and width surface 32*a* (between rolling element 33 and width surface 32*a*) in the axial direction. Each claw portion 51*d* is preferably shaped to be folded back along the shape of outer diameter surface 32*c* between annular groove 32*cb* and width surface 32*a*.

Figure 12:
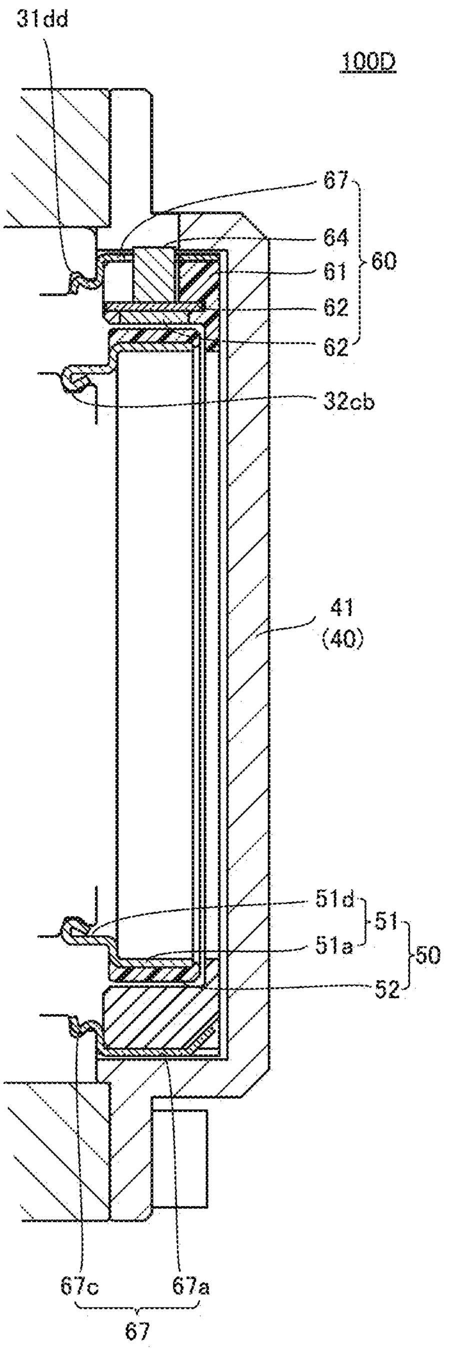
FIG. 12 is a cross-sectional view of bearing device 100D according to a modification.

FIG. 12 is a cross-sectional view of bearing device 100D according to a modification. As shown in FIG. 12, claw portions 51*d* and 67*c* do not necessarily have to have a folded-back shape as illustrated in each of the examples shown in FIGS. 10A, 10B, and 11, but may have any shapes that allow claw portion 51*d* and claw portion 67*c* to be engaged in outer diameter surface 32*c* and inner diameter surface 31*d*, respectively, when claw portions 51*d* and 67*c* are elastically deformed.

Also in bearing device 100D, sensor unit 60 is detachably attached to outer ring 31, and thus, sensor unit 60 can be reused when rolling bearing 30 is replaced. Further, in bearing device 100D, magnetic ring 50 is detachably attached to inner ring 32, and thus, magnetic ring 50 can also be reused when rolling bearing 30 is replaced.

Other Embodiments

Each of the above embodiments have been described with regard to an example in which the outer ring serves as a fixed ring and the inner ring serves as a rotation ring, but each of the above-described embodiments is applicable also to a case in which the outer ring serves as a rotation ring and the inner ring serves as a fixed ring.

It should be understood that the embodiments disclosed herein are illustrative and non-restrictive in every respect. The scope of the present invention is defined by the terms of the claims, rather than the above-described embodiments, and is intended to include any modifications within the meaning and scope equivalent to the terms of the claims.

INDUSTRIAL APPLICABILITY

The above-described embodiments are particularly advantageously applicable to a bearing device including a sensor capable of detecting the state of rotation of an inner ring.

REFERENCE SIGNS LIST

10 rotation shaft, 10*a* end, 11 body portion, 12 reduced-diameter portion, 13 reduced-diameter portion, 14 nut, 14*a* fastening hole, 20 housing, 20*a* end, 30 rolling bearing, 31 outer ring, 31*a*, 31*b* width surface, 31*c* outer diameter surface, 31*d* inner diameter surface, 31*da* outer ring raceway surface, 31*db*, 31*dc*, 31*dd*, annular groove, 32 inner ring, 32*a*, 32*b* width surface, 32*c* outer diameter surface, 32*ca* inner ring raceway surface, 32*cb* annular groove, 32*d* inner diameter surface, 33 rolling element, 34 cage, 34*a* annular portion, 34*b* support portion, 35 seal member, 36 seal member, 35*a* cored bar, 35*b* rubber, 40 preload applying member, 41 lid, 41*a* first surface, 41*b* second surface, 41*c* recess, 41*d* peripheral edge portion, 41*e* opening, 41*f*, 41*g* through hole, 42 wave washer, 43 bolt, 50 magnetic ring, 51 cored bar, 51*a* annular portion, 51*b* press-fit portion, 51*c* annular portion, 51*d* claw portion, 52 magnetic rubber, 60 sensor unit, 61 sensor housing, 61*a* groove, 61*aa*, 61*ab* groove, 61*b* through hole, 61*c* first member, 61*d* second member, 61*e* recess, 61*f*, 61*fa*, 61*fb* through hole, 62 circuit board, 63 magnetic sensor, 64 connector, 65 screw, 65*a*, 65*b* screw, 66 connector, 66*a* electric wire, 67 external annular ring, 67*a* annular portion, 67*b* press-fit portion, 67*c* claw portion, 100, 100A, 100B, 100C, 100D, 200 bearing device, A central axis.

The invention claimed is:

1. A bearing device comprising:
a rolling bearing including a rotation ring, a fixed ring, and a rolling element;
a preload applying member; and
a sensor unit, wherein
the rotation ring has a rotation ring raceway surface extending in a circumferential direction,
the fixed ring has a fixed ring raceway surface extending in the circumferential direction and facing the rotation ring raceway surface with a space therebetween in a radial direction,
the rolling element is disposed between the rotation ring raceway surface and the fixed ring raceway surface,
the preload applying member applies a preload to the rolling bearing in an axial direction, and
the sensor unit is detachably attached to one of the fixed ring and the preload applying member, the sensor unit including a sensor that detects a state of rotation of the rotation ring.

2. The bearing device according to claim 1, wherein
the rolling bearing further includes a first seal member,
the fixed ring further has
a first width surface facing the preload applying member, and
a second width surface opposite to the first width surface,
the fixed ring further has a first circumferential surface including the fixed ring raceway surface,
the rotation ring further has a second circumferential surface including the rotation ring raceway surface,
the first circumferential surface is provided with a first annular groove extending in the circumferential direction, the first annular groove being located between the rolling element and the second width surface in the axial direction,
the first seal member is inserted into the first annular groove so as to close a space between the first circumferential surface and the second circumferential surface from a side of the second width surface, and
grease is enclosed in the space.

3. The bearing device according to claim 2, wherein the sensor unit is disposed inside the preload applying member and detachably attached to the preload applying member.

4. The bearing device according to claim 2, wherein
the sensor unit further has an external annular ring,
the external annular ring includes
a first annular portion extending in the circumferential direction, and
a plurality of first claw portions extending from the first annular portion and arranged at intervals in the circumferential direction, and
the sensor unit is detachably attached to the fixed ring as the plurality of first claw portions elastically deform to be engaged in the first circumferential surface.

5. The bearing device according to claim 2, further comprising a magnetic ring, wherein
the magnetic ring is attached to the rotation ring,
the magnetic ring is magnetized alternately with an N pole and an S pole in the circumferential direction, and
the sensor is a magnetic sensor that detects the state of rotation of the rotation ring based on a change in a magnetic field from the magnetic ring, the change resulting from rotation of the rotation ring.

6. The bearing device according to claim 5, wherein
the magnetic ring includes a cored bar,
the cored bar includes
a second annular portion extending in the circumferential direction, and
a plurality of second claw portions extending from the second annular portion and arranged at intervals in the circumferential direction, and
the magnetic ring is detachably attached to the rotation ring as the plurality of second claw portions elastically deform to be engaged in the second circumferential surface.

7. The bearing device according to claim 2, wherein
the rolling bearing further includes a second seal member,
the first circumferential surface is provided with a second annular groove extending in the circumferential direction, the second annular groove being located between the rolling element and the first width surface in the axial direction, and
the second seal member is inserted into the second annular groove so as to close the space from a side of the first width surface.

* * * * *